Figure 1:
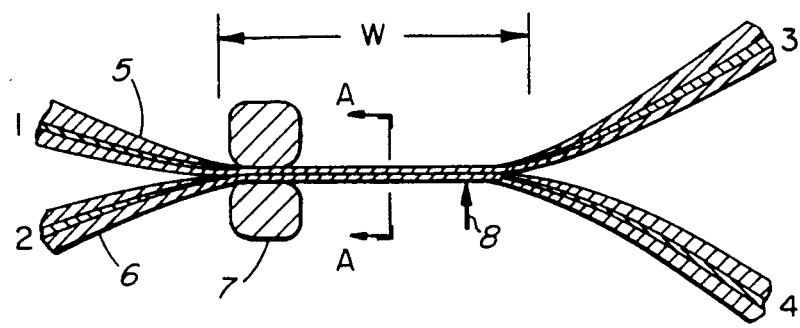

United States Patent [19]

Hill et al.

[11] Patent Number: 5,054,874
[45] Date of Patent: Oct. 8, 1991

[54] COUPLER FABRICATION TECHNIQUES FOR DISSIMILAR FIBERS

[75] Inventors: Kenneth O. Hill, Kanata; Derwyn C. Johnson, Ottawa; Robert G. Lamont, Nepean, all of Canada

[73] Assignee: Her Majesty the Queen in right of Canada, as represented by the Minister of Communications, Ottawa, Canada

[21] Appl. No.: 627,861

[22] Filed: Dec. 17, 1990

[51] Int. Cl.$^5$ .............................................. G02B 6/26
[52] U.S. Cl. ....................................... 385/28; 385/43
[58] Field of Search ................ 350/96.13, 96.15, 96.16

[56] References Cited

U.S. PATENT DOCUMENTS 4,457,581  7/1983  Johnson et al. .................. 350/96.16
4,632,513 12/1986  Stowe et al. .................. 350/96.15 X Primary Examiner—John D. Lee
Assistant Examiner—John Ngo
Attorney, Agent, or Firm—Pascal & Associates

[57] ABSTRACT

A fused twin biconical taper fiber optic splitter comprised of a pair of non-identical monomode or nominally monomode optical fibers having predetermined cladding diameters fused at respective narrowed waists, the cladding diameter of one fiber before coupler fabrication being greater than the other, whereby wavelength selective coupling between one and the other fiber is obtained.

12 Claims, 3 Drawing Sheets

COUPLER FABRICATION TECHNIQUES FOR DISSIMILAR FIBERS

This is a continuation of application Ser. No. 817,507, filed Jan. 9, 1986 has been allowed, Pat. No. 5,004,316.

This invention relates to a fiber optic splitter and particularly to a fused twin biconical taper fiber optic splitter in which coupling is effected at predetermined wavelengths.

Signals carried along optical fibers can be multiplexed by modulating the wide bandwidth signals on to different wavelengths of light and combining them together on a single fiber strand: a process termed wavelength multiplexing. In order to recover the original signals it is desirable to split or separate in wavelength the incoming signals into one or several output fibers: a process termed wavelength demultiplexing. Many different kinds of such wavelength multiplexing and demultiplexing splitters have been described. One class of such devices is described in the U.S. patent application entitled OPTICAL FIBER COUPLER WITH TUNABLE COUPLING RATIO AND METHOD OF MAKING by Brian S. Kawasaki, Masao Kawachi, Kenneth O. Hill and D. C. Johnson filed Jan. 9th, 1985, Ser. No. 690,099 (U.S. Pat. No. 4,763,977), and in the Canadian patent application entitled FIBER OPTIC DIRECTIONAL COUPLER by Kenneth O. Hill and Derwyn C. Johnson filed July 29th, 1985, Serial No. 487,720. The couplers described in those patent applications use identical monomode optical fibers, (that is, optical fibers having the same core and cladding radii, core index $n_1$ and cladding index $n_2$ such as to yield a normalized frequency $$V = \frac{2\pi a}{\lambda} \sqrt{n_1^2 - n_2^2} < 2.405$$

where $\lambda$ is the wavelength of the light and a is the core radius) narrowed to waist regions, the waist regions being fused together. These couplers are not strongly wavelength selective and therefore are limited to multiplexing or demultiplexing only a few different wavelengths of light.

We have discovered that we can create a fused twin biconical taper fiber optic splitter which is strongly wavelength selective, that is the coupling ratio varies rapidly with the wavelength of the light passing through the coupler. The coupler is fabricated from non-identical fiber, that is monomode or quasi-monomode (i.e. supports propagation in a few low order modes).

We have found that in order to achieve coupling in a fused biconical fiber optic splitter fabricated from non-identical fibers, the cladding diameters of the two fibers before fabrication need to have different sizes. That is the cladding diameter before coupler fabrication of one fiber is greater than that of the other and is suitably selected to obtain light coupling between the non-identical fibers. The process of adjusting the cladding diameters of non-identical fibers to achieve highly efficient coupling is termed tuning and the resultant device is called a tuned port splitter. We have found that tuned port splitters can be tuned to allow coupling between the lowest order mode in one fiber and a higher order mode in the other fiber. The preferred configuration, however, is to tune the splitter for efficient coupling between the lowest order modes in the two non-identical fibers. We have found the coupling ratio in these couplers to vary rapidly with wavelength.

Fused biconical fiber optic splitters can be fabricated from non-identical fibers in a tuned port 2×2 configuration or with a greater number of fiber arms, e.g. 3×3 tuned port splitters.

It is believed that this is the first time that useful coupling between the lowest order fiber modes in non-identical optical fibers has been achieved. It is believed that such a tuned port splitter will have wide wavelength multiplexing or demultiplexing applications.

The invention in general is a fused twin biconical taper fiber optic splitter comprised of a pair of non-identical nominally monomode optical fibers fused at respective narrowed waists, in which the cladding diameter before coupler fabrication of one fiber is greater than that of the other and is selected to be the correct diameter to obtain coupling between the lowest order mode in one fiber and the lowest order mode in the other fiber.

In one embodiment of the invention coupling is effected between identical monomode fibers; the cladding diameter of one fiber is larger than that of the other and is suitably selected to detune the coupling so the maximum coupling ratio that can be obtained is 50%. Such detuned splitters are found to have a coupling ratio essentially independent of wavelength.

Figure 1A:
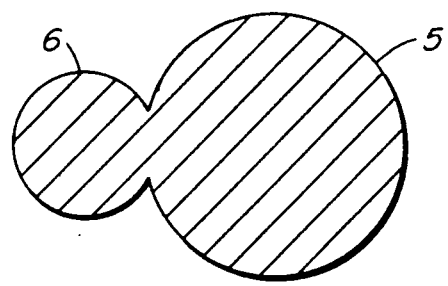
Figure 2:
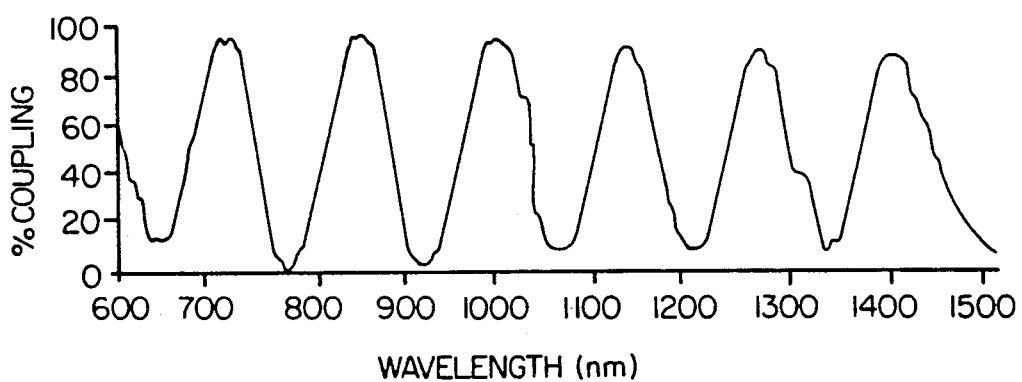
Figure 3:
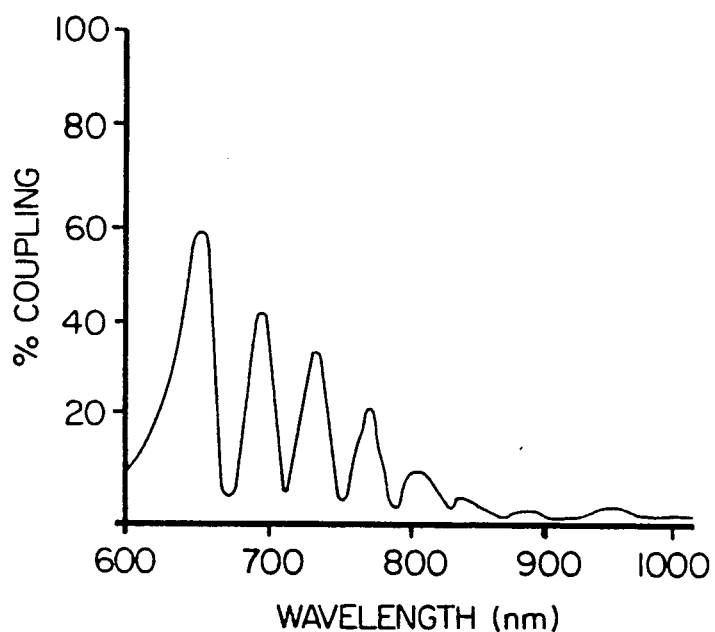
Figure 4:
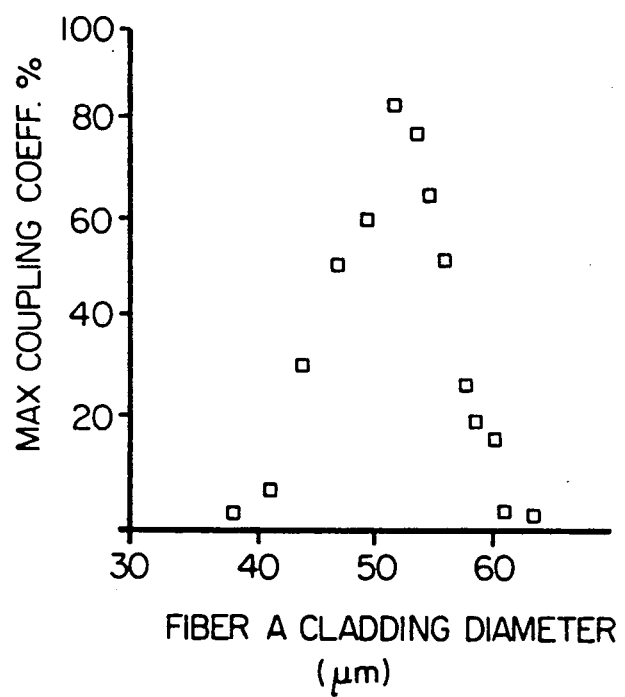
Figure 5:
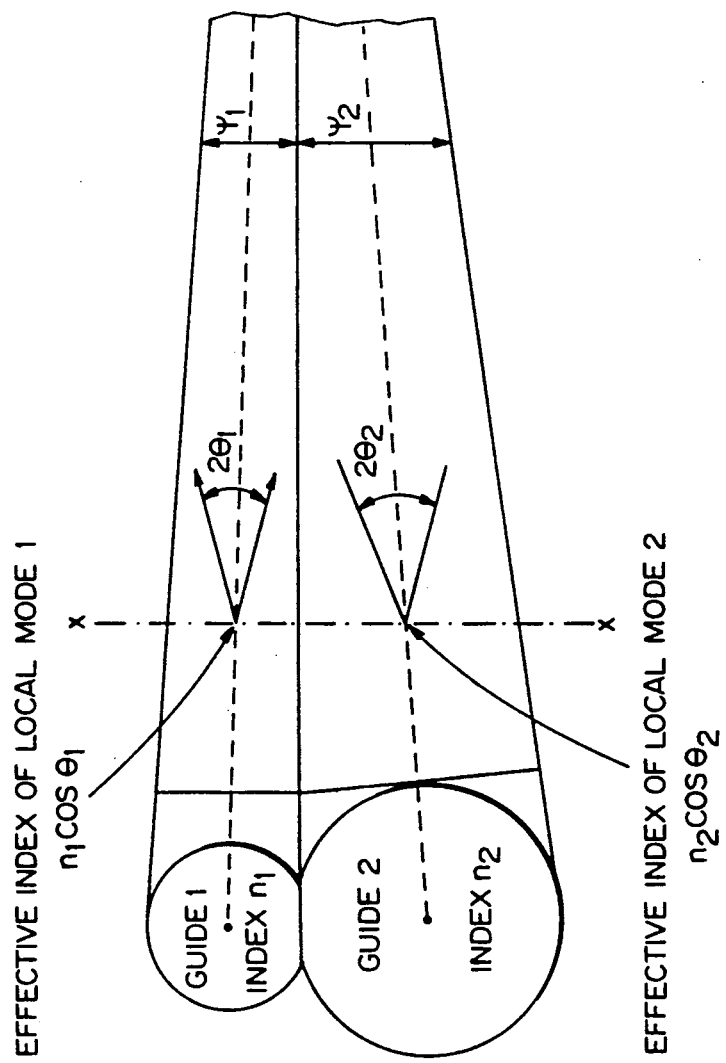

A better understanding of the invention will be obtained by reference to the detailed description below with reference to the following drawings, in which:

FIG. 1 illustrates a fused twin biconical taper fiber optic splitter in accordance with the invention, FIG. 1A is a cross-section of the splitter along section A—A of FIG. 1, FIG. 2 is a graph of percentage coupling with wavelength of a fused twin biconical taper fiber optic splitter in accordance with a previous invention, FIG. 3 is a graph of percentage coupling with wavelength of the splitter in accordance with the present invention, FIG. 4 is a graph showing the maximum coupling coefficient of the detuned splitter embodiment of the present invention as the cladding diameter of one of the fibers forming the coupler is changed, that is, detuned from the condition of both fibers having the same cladding size, and FIG. 5 is a schematic diagram of a taper portion of the splitter in accordance with the present invention showing phase velocity matching.

In FIG. 1 a fused twin biconical taper fiber optic splitter is shown. The splitter has four ports, port 1 being an input port for a monomode optical fiber 5, port 2 being an input port for a monomode fiber 6, port 3 being an output port for monomode fiber 5, and port 4 being an output port for monomode fiber 6. The fibers are tapered over a waist region designated W, and are hard fused.

Fibers 5 and 6 are different types of fiber. The core diameters, core refractive indices, and cladding refractive indices for each fiber can be different. The dimensions and refractive indices are however such that the fibers are nominally monomode and thus support the propagation of light only in the lower order modes. This condition is met for fibers with a normalized frequency $V < 8$, where $$\left( V = \frac{2\pi a}{\lambda} \sqrt{n_1^2 - n_2^2} \right)$$

By clamping the coupler by means of a clamp 7 or the like, provision is made to form a kink at the taper waist by pushing the unclamped ends of the coupler toward the clamped ends.

In order to form the coupler, the two pieces of non-identical fiber are first individually etched to reduce the cladding diameters to predetermined sizes. Then the fibers are fused together gently, for example by holding the etched segments of the fibers together in a jig and heating what will become the waist section. Once fused, the fibers are heated and pulled to form biconical tapered sections. During coupler fabrication an optical signal is applied into, for example, port 1 and light coupled to port 4 is monitored. As the tapered sections are lengthened the light power transferred to port 4 increases to a maximum corresponding to complete power transfer of all the light to port 4. With further pulling of taper the light power will cycle back and forth between ports 3 and 4. The coupler is then allowed to cool. What will have been formed is shown in FIG. 1.

Section A—A of FIG. 1 is shown in FIG. 1A. The section has a figure eight configuration in which relative diameters of the circular fibers forming the waist section is the same as the initial etched fibers. This condition is termed hard fused. If the fibers are heated more during fusing and pulling a circular cross-section can be obtained.

FIG. 2 is a graph of the coupling ratio in percent as a function of wavelength in the case in which the fibers 5 and 6 are identical monomode fibers whose cladding diameters before coupler fabrication have been etched to the same size. It may be seen that the coupling ratio varies for periodically defined wavelengths between 0% and 100% nearly equally across the entire band shown, e.g. from 600 to 1,500 namometers.

In accordance with the present invention, however, the cladding diameters of the non-identical optical fibers 5 and 6 are unequal before fabrication. After fusing as described above, the cross-section of the fused portion of the splitter appears as shown in FIG. 1A. For this case a graph of percentage coupling with wavelengths appears as shown in FIG. 3. The graph of FIG. 3 has been drawn to the same scale as that of FIG. 2. It may be seen that there is virtually no coupling above 800 nanometers; this is maintained to at least 1,200 nanometers. However at between 600 and 800 nanometers coupling is observed. Particularly at about 650 nanometers a coupling coefficient of 60% is obtained. The present invention thus exhibits a very rapid variation in coupling ratio with wavelength.

We believe that the monochromatic light carried mainly in the core of the input fiber radiates into the cladding in the decreasing taper region, and on entering the fused waist region excites a combination of the two lowest—order symmetric and antisymmetric super modes of the composite fused-cladding waveguide. The dephasing of these two modes downstream in effect transfers power from the input side of the composite cladding waveguide to the other side. The amount of coupling is determined in general by the phase difference between the symmetric and antisymmetric super mode during recapture. Recapture takes place in the increasing taper region of the output fiber of the coupler. For the present application, hard fusing of the fibers which substantially maintains the original shape of the fibers as shown in FIG. 1A should be used, forming an asymmetrical dumb-bell shape cross-section.

In successful prototypes of the invention, two different types of fibers were used, type I (core diameter=8 um, cladding diameter=125 um and cut-off wavelength of 1.1 um), and type II (core diameter=4.5 um, cladding diameter=75 um and cut-off wavelength of 0.73 um). To form the first embodiment of the invention splitters were made from two non-identical fibers, type I and type II. To form the second embodiment of the invention splitters were made from two identical type II fibers.

In the second embodiment, the two identical fibers (type II) were prepared by first etching the outer claddings to unequal diameters. The fibers were mounted in a splitter fabrication jig, fused and pulled as described earlier. By inputting e.g. 633 nanometer HeNe laser beams into ports 1 and 2, and by detecting the power outputs at ports 3 and 4, a coupling coefficient from an input to one or the other output port can be determined. While in the prototype measurements the fibers were quasi-monomode, that is the normalized frequency $V=2.8$, the launching conditions were carefully controlled to obtain preferentially $He_{11}$ fiber mode excitation. As the fibers were fused and pulled the light power was observed to transfer back and forth against the fiber output ports.

In the case in which eleven experimental splitters were fabricated from the type II fibers, the maximum observed coupling from port 1 to port 4 was plotted, and is duplicated in FIG. 4, as a function of the post-etched cladding diameters of one of the fibers, referred to as fiber A. The cladding diameter of the other fiber was kept constant at 50 um in all eleven splitters. Maximum coupling, as expected, is achieved when post-etched cladding diameters are the same (notice the peak coupling at 90%, where fiber A has a diameter of 50 um), the same as the other fiber.

An interesting case is a splitter fabricated from identical fibers but detuned so that the maximum coupling is 50%. This condition occurs in the case of a prototype splitter formed from two fibers with fiber claddings etched to 46 um and 50 um respectively or 50 um and 55 um respectively. The dependence on wavelength of the coupling ratio for this splitter would be expected to be much less than 50% splitters fabricating by other means. A 50% splitter fabricated using the invention described in the aforenoted U.S. patent application would be detuned to 50% by bending or by pulling the coupler to a length corresponding to 50% coupling at the monitoring wavelength. The coupling ratio is expected for this type splitter to change rapidly with wavelength since the 50% coupling ratio is located at the point on the sinusoidal wave depicting the wavelength dependence of the coupling ratio at which the coupling ratio as a function of wavelength has the maximum slope. However in the present invention 50% coupling is achieved by detuning the coupling through the use of fibers during the splitter fabrication in which the cladding diameters are etched to different sizes. The appropriate cladding diameters to use are determined empirically for a particular fiber such as to yield a maximum of 50% coupling on splitter fabrication. Since the wavelength dependence of the coupling ratio is now a sinusoidal curve with a maximum of 50%, the point of 50% coupling is situated at the top of the sinusoidal curve and is to a first order a region of zero slope. Thus the dependence on wavelength of such a 50% splitter is much less than those fabricated by the previous means.

A group of 17 experimental splitters was fabricated from dissimilar type I and II fibers in the configuration of the first embodiment of the invention. The cladding diameter of the type I fiber ranged from 32 um to 118 um, while the type II cladding diameter remained constant at 46 um. The following table 1 presents the four coupling coefficients $C_{I \rightarrow I}$ $C_{I \rightarrow II}$ $C_{II \rightarrow I}$ $C_{II \rightarrow II}$, the two excess losses $L_I = 1 - (C_{I \rightarrow I} + C_{I \rightarrow II})$ and $L_{II} = 1 - (C_{II \rightarrow I} + C_{II \rightarrow II})$ and the asymmetry ratio $C_{II \rightarrow I}/C_{I \rightarrow II}$ for each of the 17 splitters. The notation assumes that in FIG. 1 the type II fiber connects ports 2 and 4 and the type I fiber connects ports 1 and 3. Maximum coupling occurs for post etched cladding diameters for type I and II fiber of 87 and 46 um respectively.

pling. Peak coupling occurs when the fundamental cladding modes of the two fibers are phase-velocity matched. Phase matching in fused couplers can be achieved by two different means in two different regions of the coupler.

In order to describe the phase matching, it is useful to partition the fused coupler along its length into three sections—an entrance down-tapering fused core section of decreasing radial size (see FIG. 5), a central section of approximately constant radial dimensions, and an exit up-tapering core section of increasing radial size. In the case that coupling occurs in the central section, phase matching in a composite wave guide with a figure-of-eight (hard fused) cross-section is required. The phase-matching is achieved by adjusting the relative sizes of the lobes of the composite waveguide by etching unequally the claddings of the non-identical fibers before fabricating the coupler. The appropriate composite waveguide cross-section dimensions depends on the

TABLE 1

Performance Characteristics of Splitters Fabricated From Dissimilar Fibers.

| Splitter Identification | Post-Etched Fiber Cladding Diameters (μm) | | Coupling Coefficients C and Loss $L_I$ (%) Input Launch Port Type I Fiber | | | Coupling Coefficients C and Loss $L_{II}$ (%) Input Launch Port Type II Fiber | | | Asymmetry $C_{II \rightarrow I} \div C_{I \rightarrow II}$ | Comments |
|---|---|---|---|---|---|---|---|---|---|---|
| | Type I | Type II | $C_{I \rightarrow II}$ | $C_{I \rightarrow I}$ | $L_I$ | $C_{II \rightarrow I}$ | $C_{II \rightarrow II}$ | $L_{II}$ | | |
| 1 | 118 | 46 | 0 | 94 | 6 | 13 | 23 | 64 | High | |
| 2 | 107 | 46 | 0 | 100 | 0 | 23 | 5 | 72 | High | Output from Type I |
| 3 | 98 | 46 | 0 | 89 | 11 | 2 | 5 | 93 | High | fiber port is in a |
| 4 | 98 | 46 | 0 | 98 | 2 | 28 | 37 | 35 | High | high-order mode |
| 5 | 94 | 46 | 0 | 89 | 11 | 21 | 2 | 77 | High | |
| 6 | 90 | 46 | 62 | 17 | 21 | 58 | 9 | 33 | 0.9 | |
| 7 | 87 | 46 | 69 | 13 | 18 | 70 | 5 | 25 | 1.0 | Output from both |
| 8 | 87 | 46 | 60 | 13 | 27 | 57 | 3 | 40 | 1.0 | fiber ports is in |
| 9 | 87 | 46 | 68 | 21 | 11 | 65 | 16 | 19 | 1.0 | the $HE_{11}$ mode |
| 10 | 87 | 46 | 75 | 23 | 2 | 72 | 16 | 12 | 1.0 | |
| 11 | 82 | 46 | 75 | 10 | 15 | 54 | 5 | 43 | 0.7 | |
| 12 | 75 | 46 | 24 | 63 | 13 | 37 | 33 | 30 | 1.5 | |
| 13 | 64 | 46 | 27 | 65 | 8 | 33 | 46 | 21 | 1.2 | |
| 14 | 55 | 46 | 2 | 68 | 30 | 6 | 68 | 26 | 3.0 | Higher order mode |
| 15 | 52 | 46 | 0 | 100 | 0 | 21 | 28 | 51 | High | propagation is |
| 16 | 40 | 46 | 6 | 24 | 70 | 19 | 46 | 35 | 2.9 | observable in output |
| 17 | 32 | 46 | 4 | 39 | 57 | 14 | 19 | 67 | 3.3 | of both fiber ports |

It should be noted in particular the characteristics of splitters 9 and 10 for which excess losses are less than 20% (1 db). Clearly the selective etching of the fiber cladding to control their diameters results in a composite waveguide at the splitter waist which in effect is tuned to permit efficient energy transfer between dissimilar fibers at the chosen wavelength or band.

For type I cladding diameter greater than 94 um or less than 75 um the coupling is asymmetric and only occurs from the type II fiber to the type I fiber.

The measurements were made at 633 nm, with pure $HE_{11}$ input launch. The first column following the identication column gives the post-etched cladding diameter combinations used to make each of the couplers. The second column gives the observed cross-coupling coefficient, $C_{I \rightarrow II}$, and self-coupling coefficient, $C_{I \rightarrow I}$, and the loss, $L_I$ expressed as a percentage of the light launched into port 1. The third column lists the same quantities except that we launched light into the type II fiber. The asymmetry in the fourth column is simply the ratio of the cross-coupling coefficients and is a sensitive indicator of the presence of intermode coupling. The middle row of data is for a coupler with an asymmetry equal to unity. Note that the output from both its ports is in the $HE_{11}$ mode. Coupling is also a maximum; this is an example of a tuned-port coupler. It has relatively low loss, 2 and 12%, and reaches a respectable 75% courefractive indices of the cores and claddings and the core dimensions of the non-identical fibers being used. A second means for phase matching is possible for coupling in the down-tapering entrance section and the up-tapering exit section. The propagation velocity of the local modes can be controlled through the angle of the taper of the bicones $\psi_1$ and $\psi_2$ of FIG. 5. These taper angles are also controlled as previously by etching unequally the claddings of the non-identical fibers used to form the coupler. This type of phase-matching has been identified for the splitters shown in Table I. Splitters using the type I and II fibers with phase matching in the central region have also been obtained. The empirically determined cladding diameters are 66 um for the type I fiber and 75 um for the type II fiber. In this case the splitter has a coupling ratio of 82% and an excess loss of 8%.

To make larger input and output couplers, e.g. a 3×3 coupler, another fiber is hard fused to the two already shown in FIGS. 1 and 1A by the same process as described earlier. This fiber may be of different diameter than the first two. If a signal is launched in the widest diameter fiber, coupling will be observed into first one fiber at one relatively narrow band of wavelengths and then into the other at another relatively narrow band of wavelengths. In this manner a tuned three port coupler is obtained.

A person skilled in the art understanding this invention may now conceive of variations or other embodiments using the principles described herein. All are considered to be within the sphere and scope of the invention as defined in the claims appended hereto.

We claim:

1. A fused twin biconical taper fiber optic splitter comprised of a pair of non-identical monomode or nominally monomode optical fibers, said fibers each having a core and a cladding, having predetermined cladding diameters fused at respective narrowed waists, the cores being narrowed over biconical region adjacent said narrowed waists sufficiently to cause an optical signal carried by a core of one of said optical fibers to be passed into and to be carried by each said cladding, the cladding diameter of one fiber before coupler fabrication being greater than the other, whereby coupling between one and the other fiber is obtained.

2. A splitter as defined in claim 1 in which a monomode optical signal is coupled from the larger cladding diameter fiber to the smaller cladding diameter fiber.

3. A tuned splitter as defined in claim 2, in which coupling from the larger cladding diameter fiber to the smaller cladding diameter fiber is obtained at a predetermined wavelength or band, depending on the respective diameters of the fibers.

4. A splitter as defined in claim 1, in which the smaller cladding diameter fiber has the same core radius and the same cladding and core refractive indexes as the larger cladding diameter fiber but has been etched to a smaller cladding diameter to detune phase matching so that maximum coupling is 50%.

5. A splitter as defined in claim 1 in which the cross-section of the fibers at their junction in the coupler is dumb-bell shaped.

6. A splitter as defined in claim 1 in which a monomode optical signal is coupled from the smaller cladding diameter fiber of lower normalized frequency (V) to the larger cladding diameter fiber of higher normalized frequency (V) and an output signal from the larger cladding diameter fiber is in a higher order mode than said monomode signal.

7. A splitter as defined in claim 1, in which the smaller cladding diameter fiber is of similar type as the larger cladding diameter fiber but has been etched to a smaller cladding diameter.

8. A splitter as defined in claim 3 in which the predetermined wavelength or band is dependent on the cladding diameter ratios of the respective fibers.

9. A splitter as defined in claim 1, further including a third non-identical monomode or quasi monomode optical fiber having a biconical taper and being fused at its waist to the fused portion of said twin splitter to form a three input and three output splitter, the cladding diameter of the third fiber before splitter fabrication being different than other fibers of said pair, whereby selective coupling from one fiber to either of the other fibers can be obtained at different wavelengths.

10. A splitter as defined in claim 9 including means for bending the splitter to effect said selective coupling.

11. A splitter as defined in claim 1 in which the pair of fibers is hard fused.

12. A fused twin biconical taper fiber optic splitter as defined in claim 1 in which the fibers are tapered adiabatically to a waist region, the fibers being hard fused over the waist and which includes at least a portion of their tapered regions, an optical signal being carried by one fiber first passing through a decreasing taper region of one fiber and then passing through an increasing taper region of said one or the other fiber, the decreasing taper rate of said one fiber being such that the optical signal radiates out of the core and into the cladding, the increasing taper rates of said one and the other fiber being such that a predetermined coupling ratio is obtained at a predetermined wavelength or band and means for bending the coupler in the region of the waist whereby coupling can be selected at said wavelength or band between the decreasing taper or the waist region of said one fiber and the increasing taper or the waist of the other fiber.

* * * * *